April 4, 1961 H. C. THOMPSON 2,977,637
METHOD OF MOLDING ARTICLES
Filed April 28, 1955 2 Sheets-Sheet 1
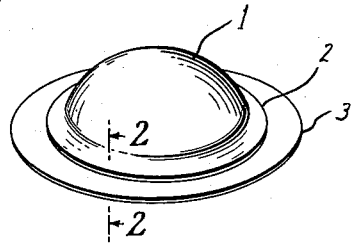
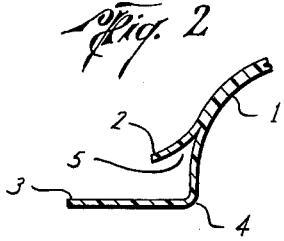
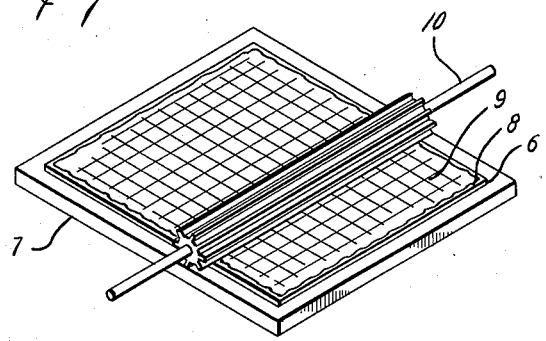
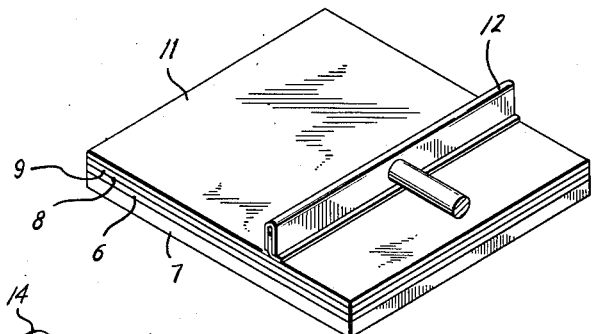
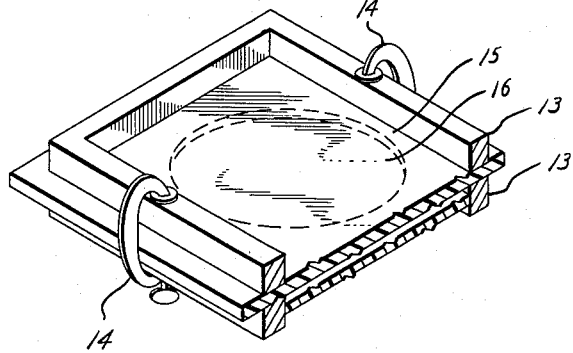
Henry C. Thompson
INVENTOR.

April 4, 1961  H. C. THOMPSON  2,977,637
METHOD OF MOLDING ARTICLES
Filed April 28, 1955  2 Sheets-Sheet 2
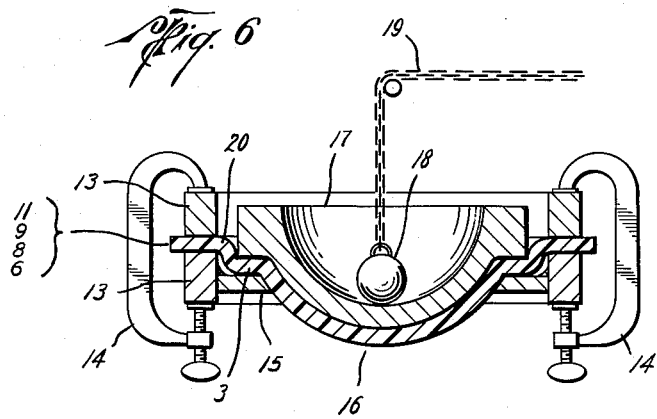
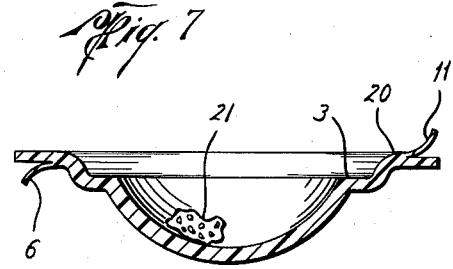
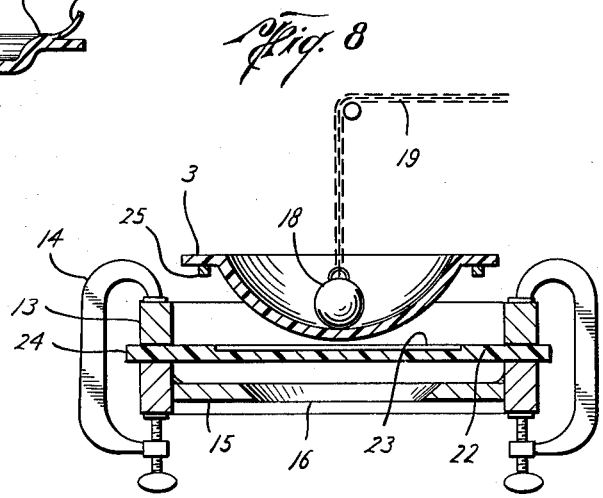
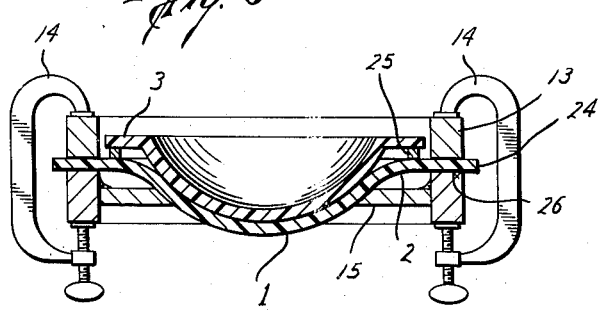
Henry C. Thompson
INVENTOR.

United States Patent Office 2,977,637
Patented Apr. 4, 1961

2,977,637
METHOD OF MOLDING ARTICLES

Henry C. Thompson, Gatesville, Tex., assignor to Conso Realty Co., Houston, Tex., a corporation of Texas Filed Apr. 28, 1955, Ser. No. 504,544

4 Claims. (Cl. 18—59)

This invention relates to a method for molding or forming plastic or resin materials, and to molded or formed products made thereby.

More specifically, this invention relates to a method of molding or forming plastic or resin materials between mold sheets or films of other plastic-based materials wherein the mold sheets are made plastic during the molding operation because of the addition of, or the presence of, a substance in the plastic or resin which acts on the mold sheets to make them temporarily plastic during the molding operation, and to molded or formed products made according to the method.

It is well known in the art to mold thermosetting plastic materials into flat sheets or into slightly convex or concave shapes by sandwiching the thermosetting plastic material in a liquid state between two mold sheets or films of another plastic material, allowing the thermosetting material to harden, for instance under the influence of heat, and then to remove the films from the surfaces of the solidified plastic. But this generally well-known method has not been successfully adapted to the molding of highly convex or highly concave shapes, for example by a deep drawing operation, since the mold sheets or films heretofore used cannot be stretched smoothly into these shapes while at the same time being subjected to a substantially equal pressure over all of their surface. If the mold pressure is not about the same over all of the surface of the film, thick areas and thin areas develop in the plastic and the shapes may not be satisfactory because of resultant weak areas or bulged areas in their surfaces. In particular, mold sheets or films of copolymers of polyvinylacetate and polyvinyl chloride, such as Firestone "Velon," and other similar materials, have proved unsatisfactory because of their tendency to wrinkle and not lay flat. Films of cellophane have proved satisfactory for flat sheet molding. Films of polyethylene have proved satisfactory for flat sheet molding and for minor draws. Films of polyvinyl alcohols and of rubber have also been used successfully for certain molding operations, but have also proved unsatisfactory where it was desired to mold highly concave or convex shapes by deep drawing.

It has been found that according to the method of this invention, highly convex or highly concave shapes with deep draws can be made using mold sheets or films of a copolymer of polyvinyl acetate and polyvinyl chloride. Firestone "Velon" films may readily be used. The discovery that makes the use of these films possible is the discovery that a film of this type may be made temporarily plastic while still possessing sufficient strength to retain the liquid material in the desired shape. While temporarily plastic, as distinguished from elastic, this film may be deep drawn into highly convex or concave shapes with very small drawing pressures being required and with no tendency of the film to revert to its undrawn flat shape or for wrinkles to develop. That is, when the plastic film is distorted by a small pressure, the distortion in the film will remain even though the pressure is withdrawn. This is an important improvement over the prior practice, since films now in use either will not stretch at all or only slightly, or else if they will stretch they are elastic and considerable pressure is required to distort them in making a drawn mold. By the present invention, it is possible to form the film into almost any concave or convex shape and thus to mold a diversified array of useful articles having these shapes. This may be done without the use of molds or dies that conform exactly to the shape to be made.

Several different plastic and resin materials may be molded or formed in practicing this invention. One of the most suitable materials is a mixture of a polyester resin containing five to twelve percent of styrene and a small amount of a catalyst such as benzoyl peroxide or methylethylketone peroxide. However, other materials and other mixtures of materials may be used. The only limitations on the plastic or resin to be molded according to hte invention are that it must be capable of being formed into a layer between the mold films, it must either contain an agent which will act on the mold films to make them temporarily plastic or the films must be treated with such an agent in a preliminary step, and it must be a material or mixture which will set after the molding operation is completed, either spontaneously or under the influence of heat, light, or other influence. Thermosetting materials are perhaps easiest to handle. Liquids, powders, or mixtures of liquids and powders may be used. In the case of the polyester mixture mentioned above, there is a slight expansion during the setting period, but that is not objectionable, since the mold is resilient. A slight contraction during setting also would not be objectionable.

Examples of suitable polyester resins are esters of glycerol and phthalic acid or maleic acid, but other esters are also suitable.

Generally speaking, it is desirable to incorporate a reinforcing material, for example a spun glass web or cloth, into the molded object to give it additional strength. This presents no difficulty as long as the reinforcing material is of such a nature that it may be drawn into the desired shape.

The articles produced in accordance with the invention are varied. Because of the translucence of plastics such as polyester resins the method is extremely useful in the manufacture of skylights and similar light-admitting devices. Skylights may be made which will admit over 80% of the incident light and are yet strong enough for usual building constructions. By proper selection of the plastic and the reinforcing materials, the articles may be made transparent. The non-transparency of sheets made of plastics such as polyester resins reinforced with spun glass cloth results mainly because of the nature of the chemical bonds between the size material on the surface of the glass and the plastic. To prevent destruction of the glass fibers through contact with the air, it is always necessary to coat extruded glass fibers with a size material. It is known that by the selection of a size material that will form the proper type of bond with the plastic, it is possible to make a reinforced plastic that is transparent like ordinary window glass. Therefore, light-admitting devices may be made according to the invention that are either translucent or transparent, depending on the selection of materials. There is practically no limit to the size of skylights that can be made according to this invention. Skylights can readily be made up to fifty feet long, and even longer if desired. The size is not limited by the size of heavy equipment, such as presses, that are required in other processes. All that is required for the method of the invention is a supported frame into which to clamp the layup.

The method of this invention is useful in making plastic boats and canoes and other large plastic articles. These articles can be made in one operation instead of by the application of a number of layers as in older methods. And because the outside surfaces of articles made according to this invention are smooth, no finishing operation is required.

Thus, many types of articles of manufacture may be made according to this invention, and the articles are superior to the same articles made according to older methods.

One object of this invention is to provide a method of molding plastic materials into convex or concave sheets or films at a low cost and with a minimum of plant equipment being required.

Another object of this invention is to provide a method of molding plastic materials into convex or concave sheets or films having a uniform thickness.

Another object of this invention is to provide a method of molding plastic materials into convex or concave shapes wherein the plastic material is retained and supported by a film or between two or more films which are made temporarily plastic during the molding operation so that they may be drawn or shaped into complex configurations during the temporary plastic period.

Another object of this invention is to provide a method of molding thermosetting plastic materials into complex configurations while subjected to only small molding pressures.

Another object of this invention is to provide a method of molding plastic materials into complex configurations having deep draws whereby the molded pieces have smooth glossy surfaces.

A further object of this invention is to provide a method of molding plastic materials into complex configurations without the use of molds or dies conforming to the configurations desired.

A still further object of this invention is to provide reinforced shaped plastic articles of a superior nature having uniform wall thicknesses and having smooth exterior surfaces.

This invention has a number of important advantages over the methods already known in the art and over the products made according to those methods. Since the mold sheet or film is plastic during the drawing operation, and not elastic, heavy presses are not required. Instead, a sufficient drawing pressure may be obtained by the use of relatively light weights acting to force the die downward. Uniform thickness of the molded sheet is easily obtainable regardless of the shape because heavy pressures at deeply drawn areas are not required, and a substantially uniform small pressure may be exerted over the entire surface in pressing it into the desired shape. It is not necessary to provide a die having the same configuration as the piece desired since it is possible to form different areas of the layup separately, for example by successively pressing against different areas with a round steel ball or with any tool to obtain the desired shape. This can be done because the mold sheet or film is not elastic and when pressed into a shape needs no support to retain it in the given shape.

The method of this invention may be performed in many different ways. From this disclosure the general concept will be made known; other ways of performing the method will be apparent to persons skilled in the art. This invention is not meant to be limited to the particular steps of performance nor to the particular illustrative examples described herein in the specification, claims, or in the drawings, of which:

Figure 1 shows a view of a plastic skylight made according to the invention.

Figure 2 shows a partial section of the edge of the skylight taken at line 2—2 in Figure 1.

Figure 3 shows the step by which reinforcing material is incorporated into the liquid plastic material by rolling with a ribbed roller.

Figure 4 shows the step by which air is removed from the layup before the molding operation.

Figure 5 shows the layup clamped into a frame ready for molding.

Figure 6 shows the molding step.

Figure 7 shows the step of removing the film from the molded piece after it has set.

Figure 8 shows a method of making a multiple-flanged piece by combining two layup pieces.

Figure 9 shows a multiple-flanged piece during the plastic setting period.

Referring now in detail to the drawings which illustrate the steps used in making a small dome-shaped skylight, Figure 1 shows a completed skylight having a dome-shaped light-admitting portion 1, an upper circular flange 2 and a lower circular flange 3. Dome 1 has a substantially hemispherical shape, and is a double-reinforced single layer of plastic material made by welding together two single-reinforced layers of the plastic. In this illustrative example the plastic is a thermosetting polyester resin, and the reinforcing webs are fiber glass cloth or matting. Lower flange 3 is at the base of dome 1 and upper flange 2 is spaced above lower flange 3 as shown. The dome and flanges are made in an integral piece by the steps shown in the other drawings. The skylight is installed by screwing, bolting, or nailing flange 3 around the hole provided for the skylight. The joint between the roof and the edge of the skylight is then made watertight by completing filling the area between flange 2 and flange 3 with the roofing material or with suitable waterproofing compounds. It is advantageous to seat or imbed lower flange 3 in the waterproofing material before securing it to the roof. The diameter of the skylight may be from very small to several feet.

Figure 2 shows more clearly the arrangement of the flanges at the base of dome 1, and is a partial section of Figure 1 taken at line 2—2. Flange 3 is flat and makes a sharp corner with the lower part of dome 1 at 4. Flange 2 is inclined and is slightly concave, as shown. In installing the skylight, area 5 should be completely filled with roofing material or waterproofing compound to prevent pumping of water caused by shrinkage and swelling of the roofing material or compound when the outside temperature changes. When the skylight is properly installed, no leakage occurs around the base of the skylight.

The method of molding plastic materials according to this invention is shown in Figures 3–9 of the drawings. First of all a "layup" is prepared. In Figure 3, a film 6 of "Velon" plastic sheet is placed flat on a supporting board or table 7. A layer of liquid thermosetting plastic 8, a polyester resin containing five to twelve percent styrene and a small amount of a catalyst such as benzoyl peroxide, is spread smoothly onto the "Velon" film 6. Next the reinforcing mat of fiber glass 9 is placed smoothly over the liquid resin 8 and rolled with a ribbed roller 10, which causes the mat 9 to sink into the layer of liquid resin and to become saturated with the resin. As shown in Figure 4, a second film of "Velon" 11 is then placed smoothly over the resin saturated mat 9, and scraped with scraper 12, or rolled with a small roller, to remove substantially all of the air from between the films 6 and 11. The layup will have a uniform thickness when the scraping or rolling operation is completed if sufficient care is exercised. Next, as shown in Figure 5, the completed layup consisting of films 6 and 11, resin layer 8, and reinforcing mat 9, is lifted from table 7 and clamped at the edges into frame 13, which is held together by clamps 14 and supported in any convenient manner. Frame 13, as better shown in Figure 6 has a board 15 at its lower part, board 15 having a circular hole 16 corresponding to the shape of the skylight. Board 15 is also used to shape the flange 3 at the base of the skylight.

After the layup has been prepared by the steps described, it is in condition for molding or shaping. As said heretofore, the liquid resin contains from five to twelve percent of styrene. It has been discovered that this styrene content is sufficient to act on the films 6 and 11 to make them temporarily plastic. It is believed that the styrene dissolved into the film from the resin, but the exact thing that takes place has not been definitely determined. However, it has been discovered that if from five to twelve percent of styrene is in the resin mixture, the copolymer films do become plastic so that they may be shaped and subjected to deep drawing operations without wrinkling or tearing and that the action is that of plasticity as distinguished from elasticity.

After the layup has been prepared and clamped into frame 13, mold or die 17 is centered over the layup and pressed downward against the top film 11 of the layup. The layup, being now plastic, is pressed downward and conforms to the shape of the underside of die 17. Only a relatively small pressure is required, and it may be obtained by means of a small weight 18 lowered into a receptacle in the top of die 17 by means of a chain 19, as shown in Figure 6. The layup passes through hole 16 in board 15 at the center and the flange 3 is shaped between board 15 and die 17, leaving a peripheral portion 20 to be trimmed off after the resin has set. When die 17 presses the layup down, the liquid resin 8 is free to flow between films 6 and 11, making the fluid pressure between the films substantially uniform at all points and allowing any excess liquid to flow toward the edges of the mold. This results in a uniform thickness of the layup after it has been pressed into shape by die 17. The thickness of flange 3 is easily adjusted by means of the spacing between board 15 and die 17, which may be predetermined or adjusted in any convenient manner.

The layup after shaping is allowed to set while clamped in frame 13, but die 17 may be removed if desired. The set will take place in a reasonably short period of time because of the effect of the catalyst in the resin mixture. An exothermic chemical reaction occurs under the influence of the catalyst which causes the resin to set. The time required for setting may be shortened by subjecting the resin to additional heat, for example in an oven.

After the resin in the layup is set, the layup is removed from frame 13 and is sprayed or swabbed with styrene. This may conveniently be done by saturating a sponge 21 with styrene and then swabbing the surface of the films with the sponge by hand, as shown in Figure 7. Films 6 and 11, which have set while the resin layer was setting, are again made plastic by the styrene so that they may be peeled from the surface of the resin. A thin film of styrene and softened resin is present on the surface of the skylight as a result of the peeling step, and this film spreads smoothly on the surface, combining with the resin, and sets, giving the skylight a smooth glazed surface without any separate finishing operation being required. The edge of flange 3 is now trimmed for example by cutting, grinding or burning to remove peripheral portion 20.

Figures 8 and 9 show a variation of the invention by which the second flange 2 is added to the skylight and a second layer is added to the dome 1 of the skylight. In carrying out this variation of the invention, a second layup 24 is made by the steps already described. Layup 24 differs from the first layup in that the top film 22 of the layup has a circular hole 23 at its center, exposing the reinforced liquid resin layer, as shown in Figure 8. Hole 23 is somewhat smaller than dome 1 in the completed skylight. The part of the skylight first made, Figures 3 to 7, is centered above the second layup and pressed downward, for example by means of weight 18, in the same way that die 17 was pressed into the first layup. Element 25 is interposed below flange 3 to adjust the spacing between flange 3 and flange 2, which is formed as shown in Figure 9. The resin layer exposed at hole 23 is brought into contact with the dome of the first piece, and becomes homogeneously welded to it during the setting of the second layup. After setting, there is no visible seam at the juncture of the two layups, and there is no impediment to the passage of light through that section of the dome. The second layup is set in the same manner as was the first layup, and then the films are removed by scrubbing or spraying them with styrene and peeling them off. A smooth glossy finish results because of the action of the styrene on the resin. The excess resin 26 at the edge of flange 2 is then removed by cutting, grinding, or burning, for example.

The description of Figures 3 to 7 exemplifies the method of making a single element plastic articles by this invention, and the description of Figures 8 and 9 exemplifies the method adapted to multi-element articles. It will be readily understood by persons skilled in the art that many modifications of the method are possible and that many different articles having varied shapes may be made thereby. The superior quality and superior physical characteristics of these articles distinguishes them from articles made by older methods.

In making other articles, for example a plastic boat, the only equipment that is required is a supported frame adapted to clamp the top rim of the boat. The manner of making a boat, or any other article will be obvious in view of the steps shown for making a skylight. The steps may be combined in any way deemed desirable.

I claim:

1. A method of molding plastic materials into complex shapes comprising molding one shape between mold films which are made temporarily plastic during the molding operation by the action of an agent contained in the plastic material, allowing the first shape to set under the influence of heat, removing the mold films from the first shape by application of a liquid which acts to again make the mold films plastic so that they may be stripped from the first shape; molding a second shape between mold films which are made temporarily plastic during the molding operation by the action of an agent contained in the plastic material, said second shape having a portion of exposed plastic material in contact with the said first shape so as to weld the second shape thereto during the molding of the second shape and while the second shape is allowed to set, removing the mold film from the second shape by application of a liquid which acts to again make the mold films plastic so that they may be stripped from the second shape; said first shape and said second shape being integrally welded together at the area of contact of the exposed plastic material of the second shape and the set first shape during the molding of the second shape and the setting of the second shape; said exterior surfaces of both said first shape and said second shape being given a smooth glossy finish by said film stripping operation by the action of the liquid on the plastic surfaces.

2. A method of molding a liquid thermosetting plastic mixture of a polyester resin, styrene, and a peroxide comprising enveloping the mixture between thin films of a copolymer of vinyl acetate and vinyl chloride, allowing the styrene to act on the said films to make the said copolymer plastic, shaping the said films and the enveloped plastic mixture into complex shapes while the plasticity of the said films obtains, setting the plastic mixture and the said films in the complex shapes, removing the films by the application of additional styrene to the film surfaces, said additional styrene also acting on the surfaces of the set plastic mixture to give them a smooth finish.

3. A method of molding plastic materials comprising retaining a continuous layer of unset plastic material having imbedded therein a mat of reinforcing material between thin films of set plastic material, said unset plastic material containing an agent which acts to temporarily plasticize said films on contact therewith, manipulating said plasticized films and unset plastic layer therebetween by drawing to a desired form for said unset plastic layer, setting said plastic layer in said desired form, applying a film-plasticizing liquid to said films exterior of said set plastic layer, stripping said plasticized films from said set plastic layer, said liquid also acting on the surface of said set plastic layer to give a smooth glazed finish thereto when set, whereby the mold films are removed and the said surfaces are glazed in one operation.

4. Method according to claim 3 including joining together, by bonding of said plastic, plural set plastic layers prepared in the manner aforesaid, whereby a composite plastic article of plural plastic elements results.

References Cited in the file of this patent

UNITED STATES PATENTS

| | | |
|---|---|---|
| 2,142,968 | Stoesser | Jan. 3, 1939 |
| 2,209,940 | Smith | July 30, 1940 |
| 2,485,798 | Whyte et al. | Oct. 25, 1949 |
| 2,613,397 | Borkland | Oct. 14, 1952 |
| 2,720,004 | Phreaner | Oct. 11, 1955 |

FOREIGN PATENTS

| | | |
|---|---|---|
| 716,033 | Great Britain | Sept. 29, 1954 |